(12) United States Patent
D'Angelo et al.

(10) Patent No.: US 7,085,782 B2
(45) Date of Patent: Aug. 1, 2006

(54) LOG GROOMING IN A MULTI-LOG ENVIRONMENT

(75) Inventors: Dario D'Angelo, Los Gatos, CA (US); Mary Anne Morgan, Morgan Hill, CA (US); Trung Q. Nguyen, San Jose, CA (US); Alan R. Smith, Gilroy, CA (US); Thomas R. Sullivan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/438,949

(22) Filed: May 14, 2003

(65) Prior Publication Data

US 2004/0230623 A1    Nov. 18, 2004

(51) Int. Cl.
   *G06F 17/30*   (2006.01)
(52) U.S. Cl. .................................. 707/202; 714/20
(58) Field of Classification Search ............. 707/200, 707/202, 203; 718/101; 714/20, 723
   See application file for complete search history.

(56) References Cited

U.S. PATENT DOCUMENTS

| | | | | |
|---|---|---|---|---|
| 5,412,801 A | 5/1995 | de Remer et al. | .......... | 395/575 |
| 5,640,561 A | 6/1997 | Satoh et al. | .......... | 395/618 |
| 5,835,915 A * | 11/1998 | Carr et al. | .......... | 714/20 |
| 6,061,769 A | 5/2000 | Kapulka et al. | .......... | 711/162 |
| 6,065,018 A | 5/2000 | Beier et al. | .......... | 707/202 |
| 6,092,085 A | 7/2000 | Keene | .......... | 707/202 |
| 6,202,071 B1 | 3/2001 | Keene | .......... | 707/202 |
| 2003/0226058 A1 * | 12/2003 | Miller et al. | .......... | 714/15 |

OTHER PUBLICATIONS

Mohan, C., et al.; "Algorithms for the Management of Remote Backup Data Bases for Disaster Recovery"; IEEE, p. 511-518, 1993.
IBM U.S. Appl. No. 09/028,193,(Pending)—filed Feb. 23, 1998, 43 pages.

* cited by examiner

*Primary Examiner*—Uyen Le
*Assistant Examiner*—Kavita Padmanabhan
(74) *Attorney, Agent, or Firm*—Kunzler & Associates (57) ABSTRACT

A log list comprising log identifiers is received, wherein the log list delineates a set of logs to be groomed. A log sequence number and a time-stamp are extracted from the first log record of each log in the set of logs. A system ID is extracted from a log record of each log in the set of logs. An appended log list is created wherein the system ID, time-stamp and log sequence number comprise appended information that is logically appended to each of respective ones of the log identifiers. The appended log list is sorted utilizing at least a portion of the appended information, the result comprising a sorted appended log list. An actual log sequence number is extracted from the last log record of each log in the set of logs. Each of the actual log sequence numbers is compared to a corresponding predicted log sequence number, wherein the corresponding predicted log sequence number is computed utilizing the sorted appended log list. A report is generated wherein range information reflecting all discrepancies between the actual log sequence numbers and the corresponding predicted log sequence numbers are disclosed.

22 Claims, 10 Drawing Sheets

LOG GROOMING IN A MULTI-LOG ENVIRONMENT

FIELD OF INVENTION

The present invention relates generally to the processing of IMS (Information Management System) logs. IMS is a trademark of International Business Machines Corporation in the United States, other countries, or both.

More specifically, the present invention relates to a method, program product and apparatus to assist system administrators and other support personnel in the preparation and processing of logs in a multi-log environment.

BACKGROUND

IMS is a hierarchical database management system (HDBMS) developed by International Business Machines Corporation. IMS has wide spread usage in many large enterprises where high transaction volume, reliability, availability and scalability are of the utmost importance. The high reliability and availability is achieved in part by the incorporation of logging within IMS.

Two types of system logs are found within IMS. One type of log is the IMS OLDS (Online Log Data Sets) log. The OLDS log is the primary receiver of system-generated records that capture important data processing event-related information during IMS processing. Logs, and the information contained therein, are used for many different purposes. Typical examples include monitoring and/or tracing IMS transaction/database activity, creating audit trails and debugging transaction or database related problems.

IMS logs may be very large in IMS systems where it is quite common for thousands of transactions may be processed every minute of every day in a 24/7 computing environment. Individual log records may also be very large, where a single logical log record may span several physical blocks within the log file. Furthermore, within a given log file, there may be substantial variation in data format, including unformatted string data comprising character data, binary data and other coded information making meaningful translation for a human reader very difficult.

Each log record is identified by a one-byte hex field known as a "type code". A log record may also optionally contain an additional one-byte "subtype code". In order to properly interpret and provide meaning for a given log record, a DSECT (Dummy Section) matching the type code and subtype code for the given record must be utilized. The large number type codes and subtype codes, in combination with large log file sizes and large record sizes, results in an extraordinarily tedious process in attempting to perform any type of manual analysis of log data. A manual analysis may be further exasperated in an environment where multiple logs may be relevant to the task at hand.

There are a finite number of OLDS logs available online to an IMS subsystem. This log pool is defined to IMS utilizing a system parameter. Although the number of logs can be increased, it is not feasible to have a pool of online logs with sufficient capacity to accommodate logging activity over an indefinite period of time. Consideration must be given to IMS environments where one or more IMS subsystem may be running for months at a time. To accommodate extended time processing environments, IMS reuses OLDS logs, as briefly described infra.

Whenever the current log fills up, or whenever an IMS command is issued to switch logs, IMS switches to the next log in the OLDS log pool. However, before an OLDS log is reused, the contents of the log is archived to an SLDS (System Log Data Sets) log. In this way, a limited number of OLDS logs can accommodate all logging for an IMS subsystem over an extended time period. However, those skilled in the art will recognize that an infinite number of log records can be generated, as there is no limitation on the number of SLDS logs that can be created as processing continues for many months and years.

It may be necessary to perform an analysis of log data, for reasons discussed supra, covering a particular period of time. The chosen time period may involve only SLDS logs, only OLDS logs, or a combination of both SLDS logs and OLDS logs. However, log analysis is typically performed on SLDS logs. The term "IMS log" or "log" is hereinafter used to refer to either an OLDS log or an SLDS log in those contexts where it is not necessary to distinguish between different log types.

In order for a plurality of logs to contribute to productive analysis, it is typically a requirement to have no intervening time gaps between individual log files comprising the set of log files to be analyzed for a given IMS subsystem. Although the logs are generally created at one physical location for a given IMS subsystem, it is not unusual to physically ship these logs to a different location for analysis, such as a central service center.

Database Recovery Control (DBRC) is a feature of IMS, which, among other things, tracks the use of OLDS and SLDS logs. The use of this tool to achieve a set of logs with no intervening time gaps may be cumbersome to use, time consuming and error prone in some computing environments. For example, the use of DBRC may be impractical where logs are transmitted to a service center. This is because the logs may become renamed such that they no longer match the DBRC-registered names. Furthermore, the service center may not have an installed DBRC for the logs being received even in those cases where the logs have not been renamed. Accordingly, a set of log thought to be complete may actually have missing logs or extra extraneous logs. Improperly groomed logs may happen for a variety of reasons, including the use of loosely contrived naming conventions which are not clearly defined, mixing logs from multiple IMS images, inadequate research, as well as simple human error.

Once the logs are received by a service center, it may take several hours or possibly days to determine what logs have been received and to establish the proper time-order sequencing for processing. Errors detected at this stage are a source of substantial further delays. Customers are contacted with a blur of information reflecting confusion over what exactly was shipped and why it was irregular in its receipt at the service center. Frequently substantial additional research and rework is required to ship a new set of logs.

IMS logs contain variable length records resulting in the log sequence number (LSN) being positioned at different physical offsets within each record. This characteristic precludes the use of standard sort utilities, which require the field controlling the sort to be at a fixed physical location within the set of records to be sorted.

Accordingly, there is a great need to provide a simple, quick and automated way to sort through a set of log files whereby comprehensive verification of the logs is easily accomplished as preparation for further log analysis. This verification, as discussed supra, includes verifying that a set of logs is complete, organizing the logs by IMS image, properly time-sequencing the logs, and identifying gaps in the sequence including the specific time range unaccounted for. This above described verification is hereinafter referred to as "log grooming".

SUMMARY OF THE INVENTION

To overcome the limitations in the prior art briefly described above, the present invention provides a method, computer program product, and system to assist system administrators and other support personnel in the grooming of logs in a multi-log environment.

A log list comprising log identifiers is received, wherein the log list delineates a set of logs to be groomed. A log sequence number and a time-stamp are extracted from the first log record of each log in the set of logs. A system ID is extracted from a log record of each log in the set of logs. An appended log list is created wherein the system ID, time-stamp and log sequence number comprise appended information that is logically appended to each of respective ones of the log identifiers.

The appended log list is sorted utilizing at least a portion of the appended information, the result comprising a sorted appended log list. An actual log sequence number is extracted from the last log record of each log in the set of logs. Each of the actual log sequence numbers is compared to a corresponding predicted log sequence number, wherein the corresponding predicted log sequence number is computed utilizing the sorted appended log list. A report is generated wherein range information reflecting all discrepancies between the actual log sequence numbers and the corresponding predicted log sequence numbers are disclosed. An embodiment encompassing the above logic steps is hereinafter referred to as a log grooming tool.

In another embodiment of the present invention, the above-described processing may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for preparing a set of logs for further processing is also disclosed. A grooming tool is identified on a Job Control Language EXEC statement. A log list is created wherein the log list identifies each log of the set of logs to be groomed. This log list is made available to the grooming tool. A job is submitted for execution on a computer system wherein the job comprises the Job Control Language Exec statement. A report generated by the grooming tool is received and utilized to prepare for subsequent processing of the set of logs.

In this manner, a set of logs can be groomed in preparation for subsequent processing and analysis in a valid and efficient manner. Desirable results are achieved with less manual effort while substantially reducing the possibility of an accidental omission of a critical log, or an inadvertent submission of improperly sequenced logs.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION

The present invention overcomes the problems associated with the prior art by teaching a system, computer program product, and method to assist system administrators and other support personnel in the grooming of logs in a multi-log environment. A set of logs is considered to be "groomed" when they are organized by system, and within each system are properly time-sequenced. This grooming process will identify any missing logs, along with the associated time gap, as well as superfluous logs representing a time sequence outside the scope of interest. This grooming process prepares the set of logs for subsequent processing and analysis, which is typically focused on a predetermined period of time.

In order for a plurality of logs to contribute to productive analysis, it is typically a requirement to have no intervening time gaps between individual log files comprising the set of log files to be analyzed for a given IMS subsystem. Although the logs are generally created at one physical location for a given IMS subsystem, it is not unusual to physically ship these logs to a different location for analysis, such as a central service center.

A set of logs, thought to be complete, may actually have missing logs or extra extraneous logs. This happens for a variety of reasons. Some common examples include the use of loosely contrived naming conventions, mixing logs from multiple IMS images, inadequate research, as well as simple human error. Once the logs are received by a service center, it may take several hours or possibly days to determine what logs have been received and to establish the proper time-order sequencing for processing. Errors detected at this stage are a source of substantial further delays. Customers are contacted with a blur of information reflecting confusion over what exactly was shipped and why it was irregular in its receipt at the service center. Frequently, substantial additional research and rework is required before a new set of logs can be shipped to the service center for analysis.

The teaching of the present invention provides for a simple, quick and automated way to groom a set of log files whereby comprehensive verification and sequencing of the logs is easily and automatically accomplished as preparation for further log analysis for a predetermined time period. This verification, as discussed supra, includes verifying that a set of logs is complete, organizing the logs by system image, properly time-sequencing the logs, and identifying gaps in the sequence including the specific time range unaccounted for.

In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described herein. The following description is presented to enable one of ordinary skill in the art to make and use the present invention and is provided in the context of a patent application and its requirements.

Figure 1:
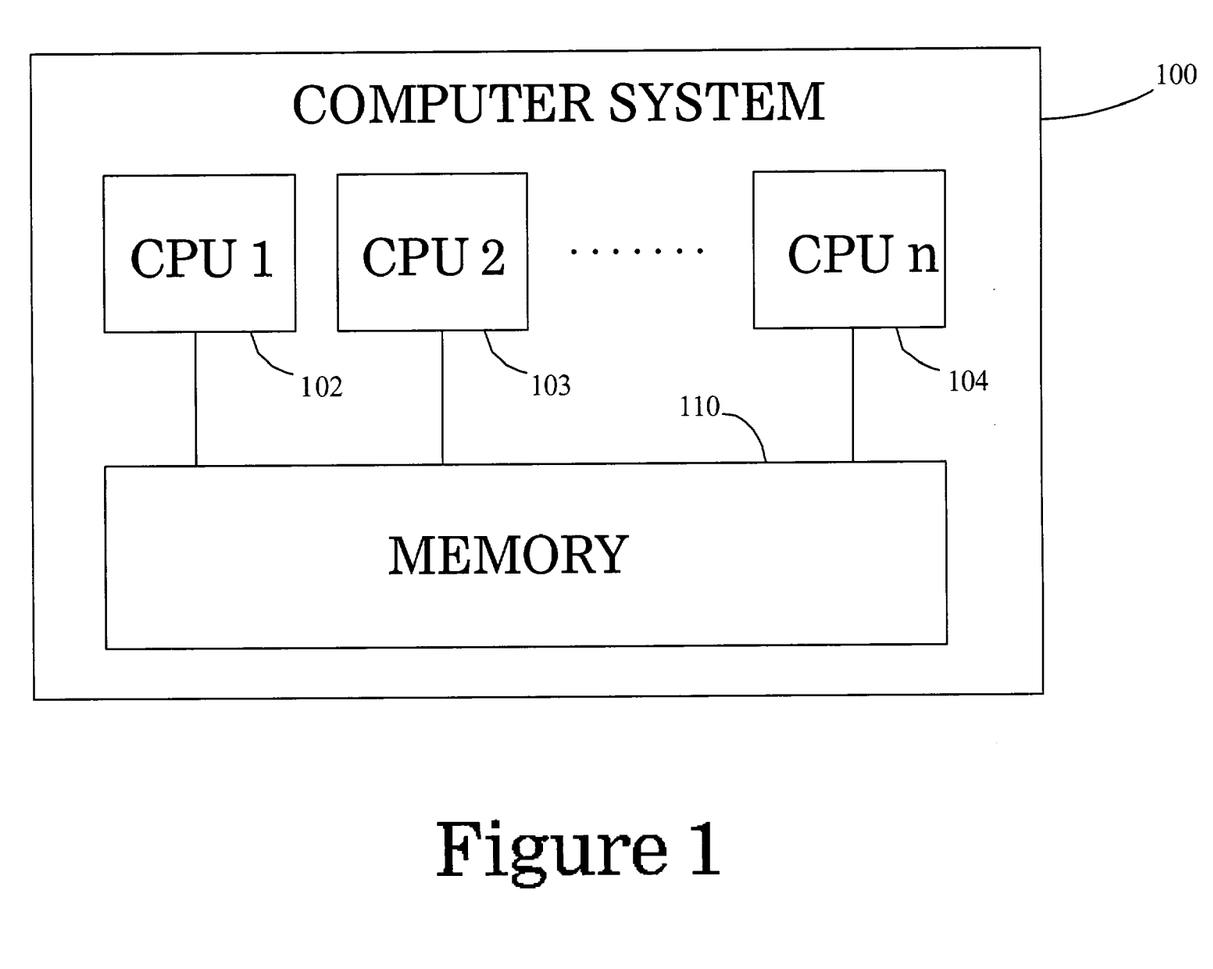
FIG. 1 is a block diagram of a typical computer system wherein the present invention may be practiced.

FIG. 1 is a block diagram of a computer system 100, such as the zSeries mainframe computer system. (zSeries is a trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Accordingly, any other alternative computing environments may be used without departing from the spirit and scope of the present invention.

Figure 2:
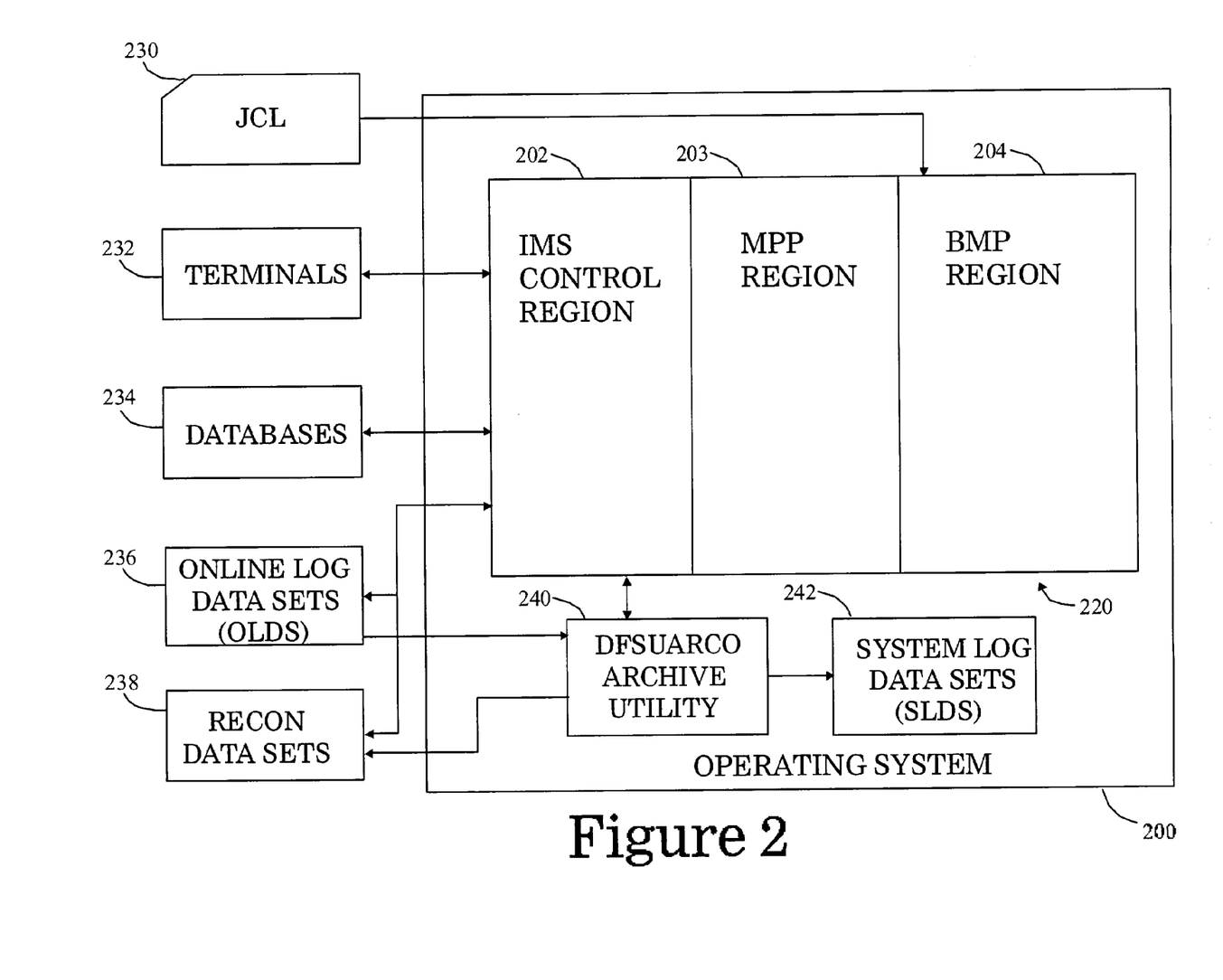
FIG. 2 is a block diagram of an exemplary IMS subsystem.

Referring now to FIG. 2, a block diagram is shown illustrating an exemplary computing environment wherein log data is generated and accumulated for subsequent analysis. Operating system 200, such as the z/OS operating system, is suitable for managing the resources of computer system 100 and providing the framework for running other computing subsystems and application programs. (z/OS is a trademark of International Business Machines Corporation in the United States, other countries, or both.) Subsystems functionally capable of being provided under the z/OS operating system include the IMS subsystem 220. The IMS subsystem 220 comprises an IMS Control region 202, which manages the region resources comprising Message Processing Program (MPP) region 203 and BMP region 204. Other resources that communicate with, or are managed by, IMS subsystem 220 comprise terminals 232, databases 234, Online Log Data Sets (OLDS) 236, Recon Data Sets 238 and Job Control Language (JCL) 230. Databases 234 may comprise several different types of IMS databases, such as DEDB, HDAM, HIDAM and HISAM.

DFSUARCO archive utility 240, invoked by IMS Control Region 202, receives control from and executes under operating system 200. DFSUARCO archive utility 240 archives a specified Online Log Data Set 236 prior to its reuse by IMS Control Region 202. The archival of Online Log Data Sets result in the creation of System Log Data Sets (SLDS) 242. DFSUARCO updates Recon Data Sets 238 to reflect the existence of each newly archived log.

Those of ordinary skill in the art will recognize that FIG. 2 is exemplary in nature and that many other system configurations are possible within the scope of the present invention. For example, in an alternative IMS configuration other regions, such as an Interactive Fast Path (IFP) region, could also exist.

Generally, the novel methods herein disclosed may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
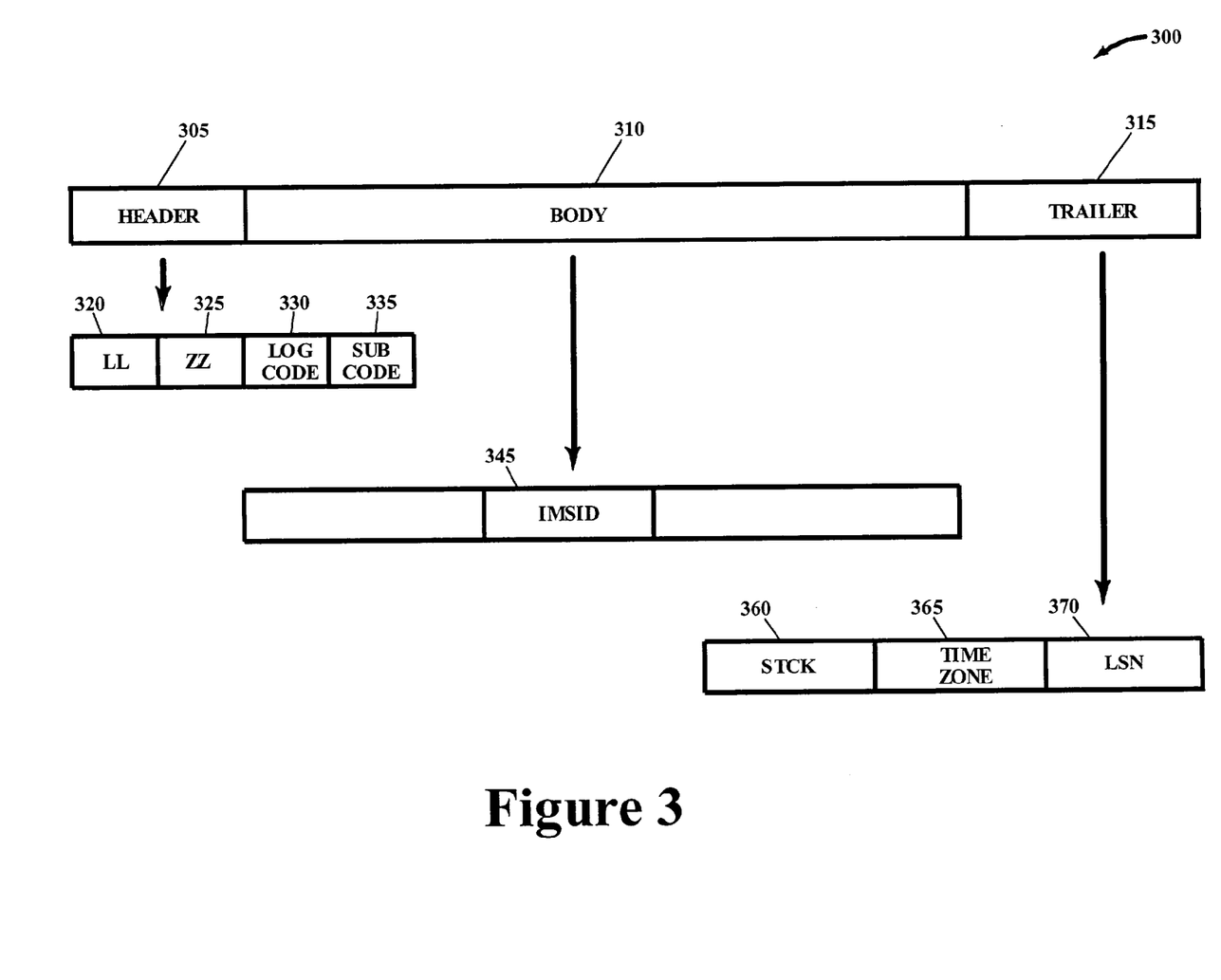
FIG. 3 is a layout of an exemplary log record.

Referring now to FIG. 3, an exemplary log record 300 is shown as generated by the exemplary system illustrated in FIG. 2. Log record 300 comprises header 305, body 310 and trailer 315. Header 305 comprises a two byte length field 320, a two byte reserved field 325, a one byte log type code 330 and, optionally, a one byte log subtype code 335. Body 310 of log record 300 may contain, depending upon the log type code and log subtype code, an IMS ID (IMSID) 345. Trailer component 315 comprises a Store Clock Value (STCK) 360, a Time Zone 365 and a Logical Sequence Number (LSN) 370. Reference to log record 300 and the various fields described in FIG. 3 are referenced from time to time as details of the present invention are further disclosed. Numerous other fields, mandatory or optional, may be present with log record 300. These other fields are not specially shown in FIG. 3 as they are not required to fully comprehend the present invention.

Figure 4:
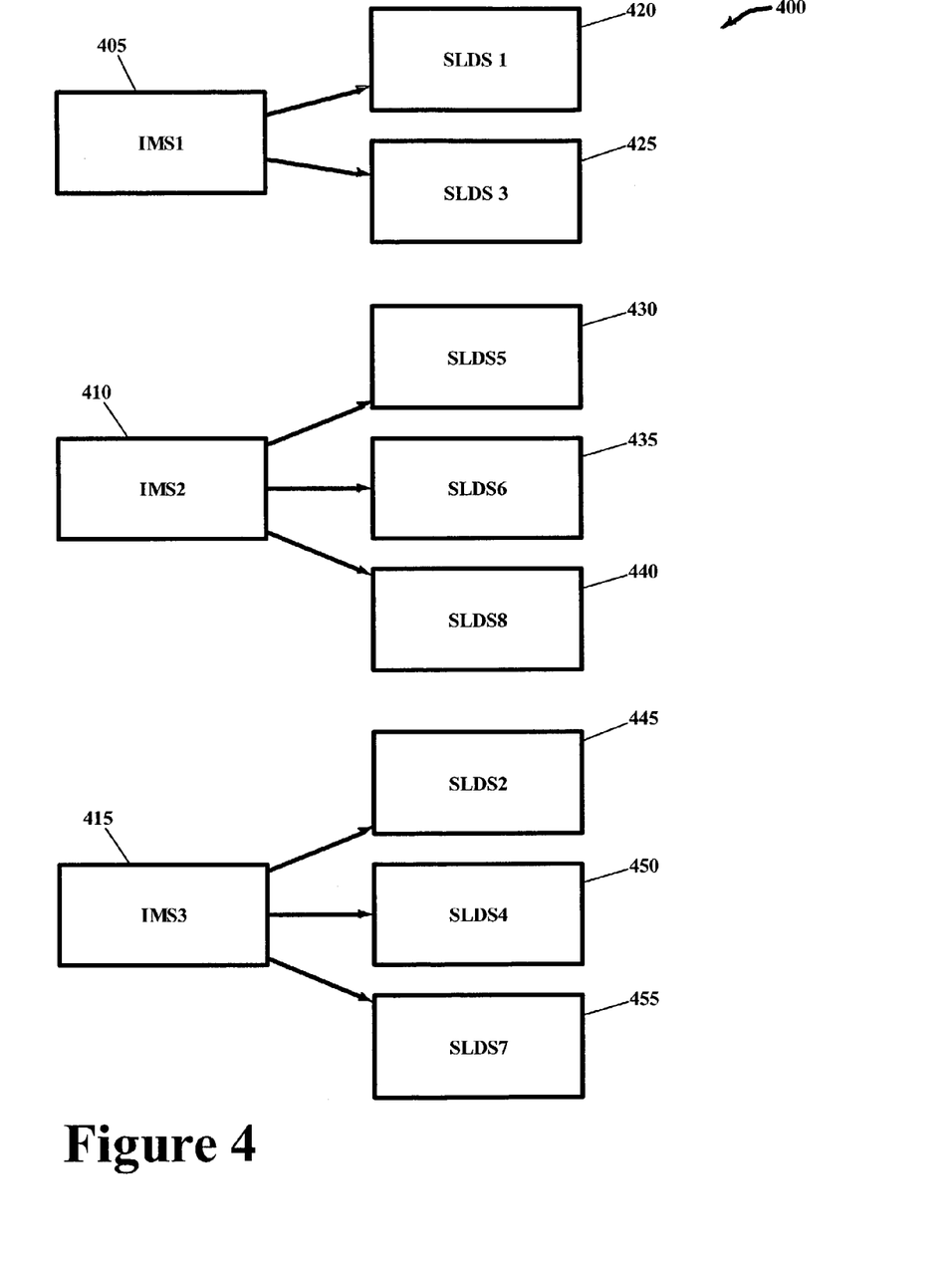
FIG. 4 is a block diagram of an exemplary set of logs to be groomed.

Referring now to FIG. 4, block diagram 400 shows an exemplary set of IMS logs and their affinity to the particular IMS system in which they were created. IMS1 405 created two System Log Data Sets referred to in the present example as SLDS1 420 and SLDS3 425. In similar fashion, we have logs SLDS5 430, SLDS6 435 and SLDS8 440 associated with IMS2 410 and logs SLDS2 445, SLDS4 450 and SLDS7 455 associated with IMS3 415. This exemplary set of logs will be utilized to illustrate various aspects of the present invention further described infra.

Figure 5:
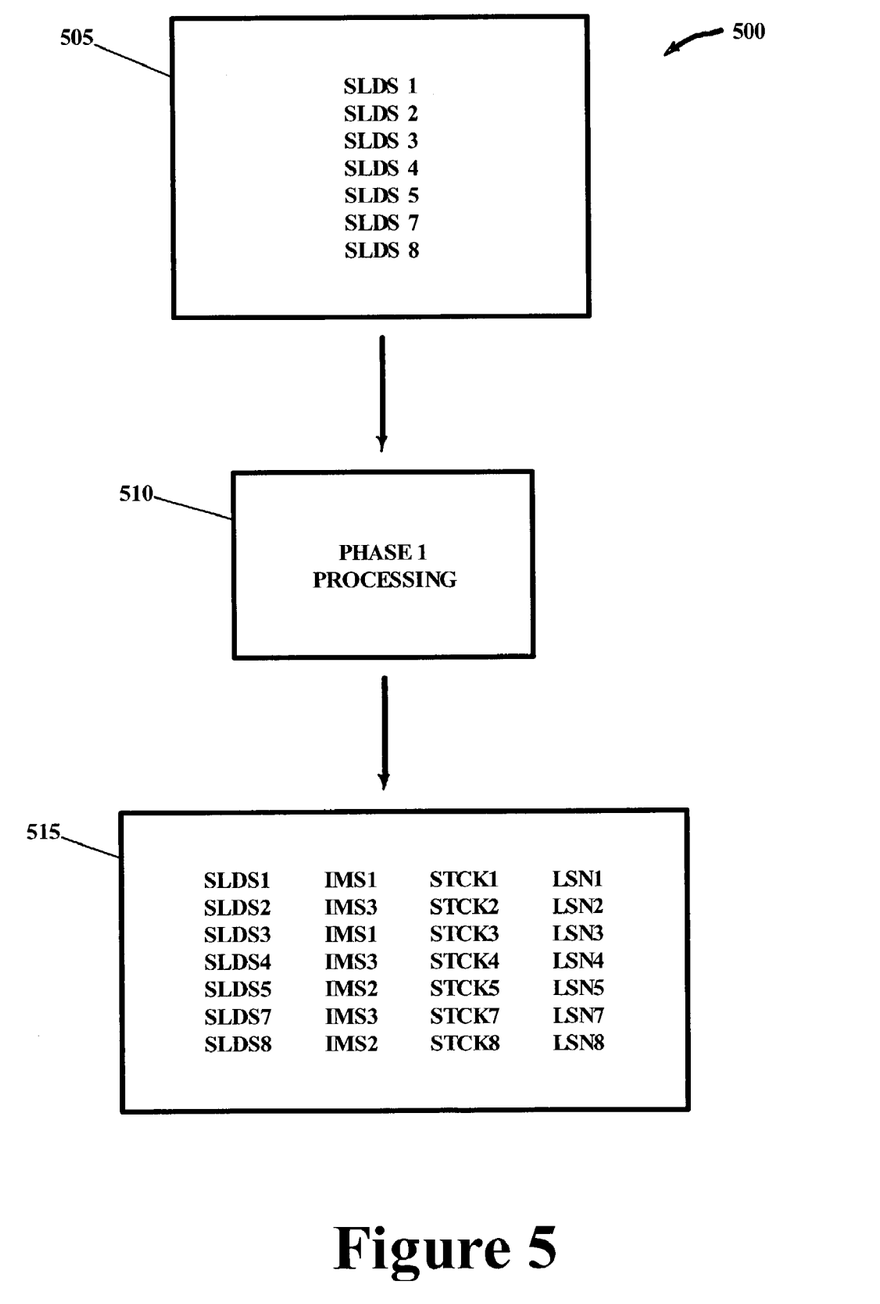
FIG. 5 illustrates an exemplary transformation of a log list to an appended log list.

Referring now to FIG. 5, block diagram 500 illustrates the exemplary transformation of log list 505 to appended log list 515 in accordance with Phase 1 Processing 510. Log list 505 comprises the set of logs depicted in FIG. 4, excepting only log SLDS6 435 associated with IMS2 410. This exception is for the purpose of illustrating a novel aspect of the present invention and is representative of an erroneous omission commonly made in specifying a complete set of logs required to cover a predetermined period of time.

Figure 8:
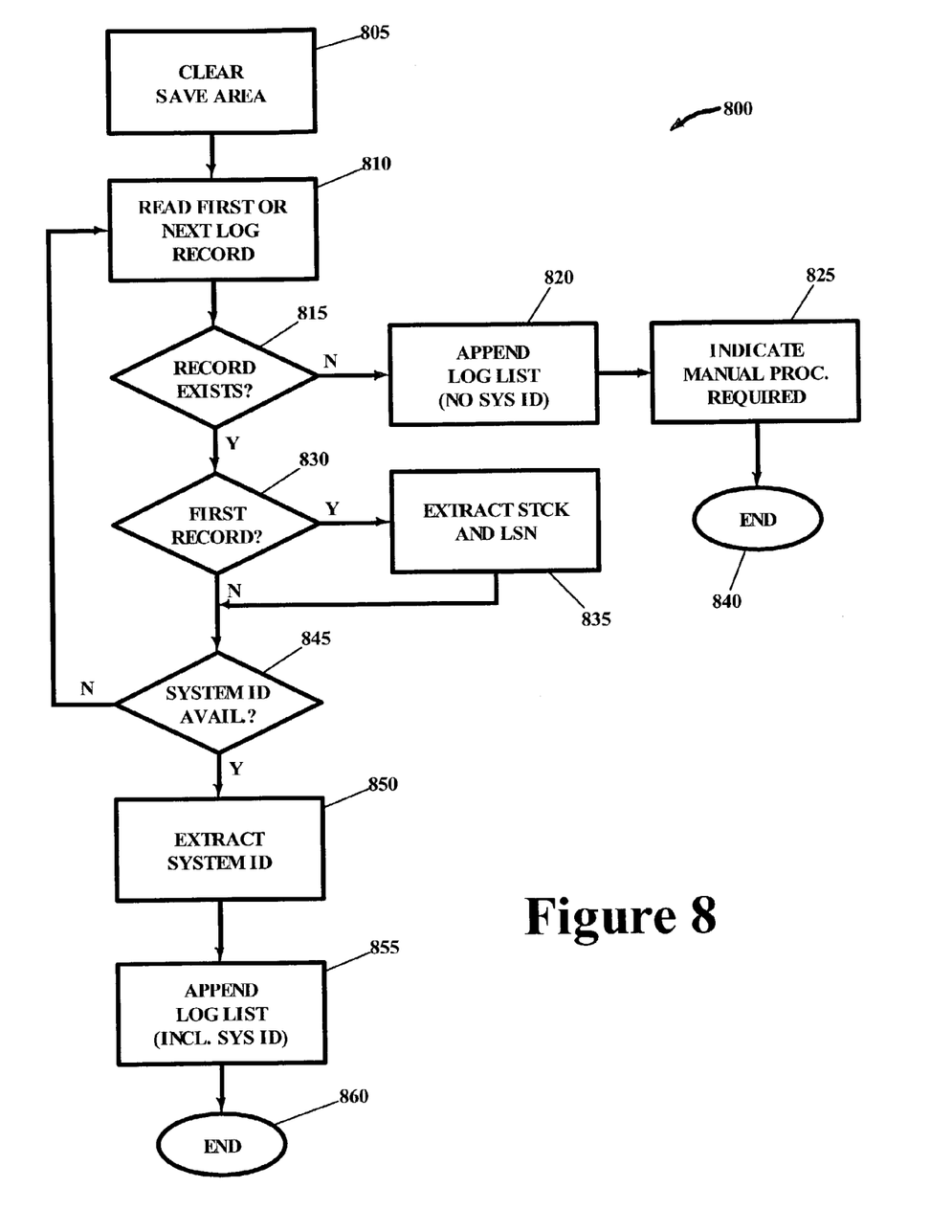
FIG. 8 is a flow diagram summarizing one embodiment of a routine for performing Phase 1 processing.

Appended log list 515 is transformed from log list 505 by Phase 1 Processing 510, described infra in conjunction with flow diagram 800 of FIG. 8. Appended log list 515 comprises a list of each of the logs identified in log list 505 with additional appended information for each log in the list. This additional appended information comprises the System ID (as depicted by IMSx), the Stored Clock Value (as depicted by STCKx), and Logical Sequence Number (as depicted by LSNx) as listed in block 515.

Figure 6:
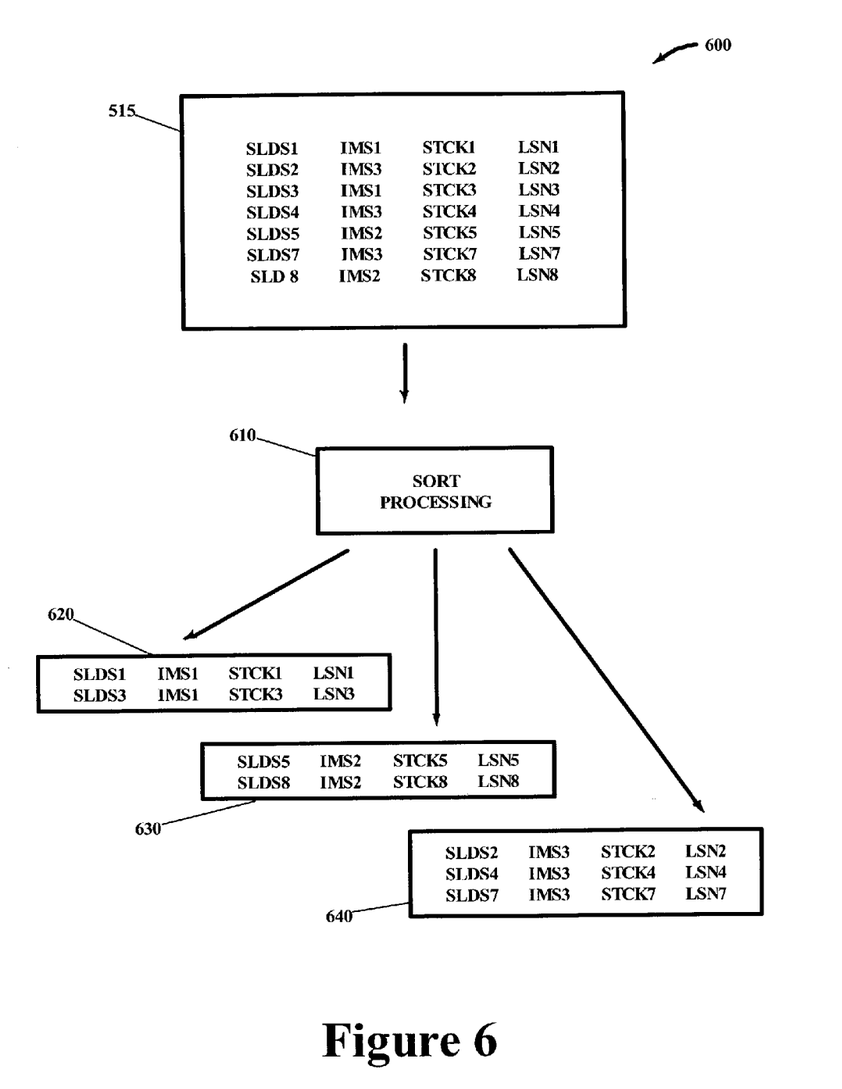
FIG. 6 illustrates an exemplary transformation of an appended log list to a sorted appended log list.

Referring now to FIG. 6, block diagram 600 illustrates the sorting of appended log list 515 into sorted appended log lists 620, 630 and 640 in accordance with Sort Processing 610. Appended log list 515 is first sorted by System ID, wherein sorted appended log list 620 comprises entries for IMS1, sorted appended log list 630 comprises entries for IMS2 and sorted appended log list 640 comprises entries for IMS3. Sorted appended log lists 620, 630 and 640 are then each further sorted by Stored Clock Value, as depicted in blocks 620, 630 and 640.

Those of ordinary skill in the art will appreciate that sorting processes and algorithms are well known in the art and that a wide variety of sorting techniques are available to produce the arrangement of entries depicted in blocks 620, 630 and 640. Furthermore, although depicted as separate blocks in block diagram 600, block 620, 630 and 640 could also be depicted as a single block containing the same entries, in the same order, as discrete blocks 620, 630 and 640. Accordingly, blocks 620, 630 and 640 are hereinafter referred to collectively as a "sorted appended log list".

In an alternative embodiment, in addition to sorting by Stored Clock Value, a further sort may also be performed on Logical Sequence Number to break a tie between two equal Stored Clock Values. While theoretically possible, it is highly unlikely that two Stored Clock Values would be equal within a single System ID. In another alternative embodiment, a sort on Logical Sequence Number replaces the sort performed on Stored Clock Value. Whenever Logical Sequence Number is utilized during Sort Processing 610, consideration must be given to the possibility that a Logical Sequence Number may revert back to zero or one (depending upon whether the LSN is zero origined or unity origined, respectively) whenever a Logical Sequence Number would otherwise have exceeded a maximum value. This anomaly may be accounted for in a variety of ways in order to ensure that a Logical Sequence Number in reversion is still accorded a proper sequence value with respect to sort processing. The details are not provided herein as such schemas are known to those of ordinary skill in the art.

Figure 7:
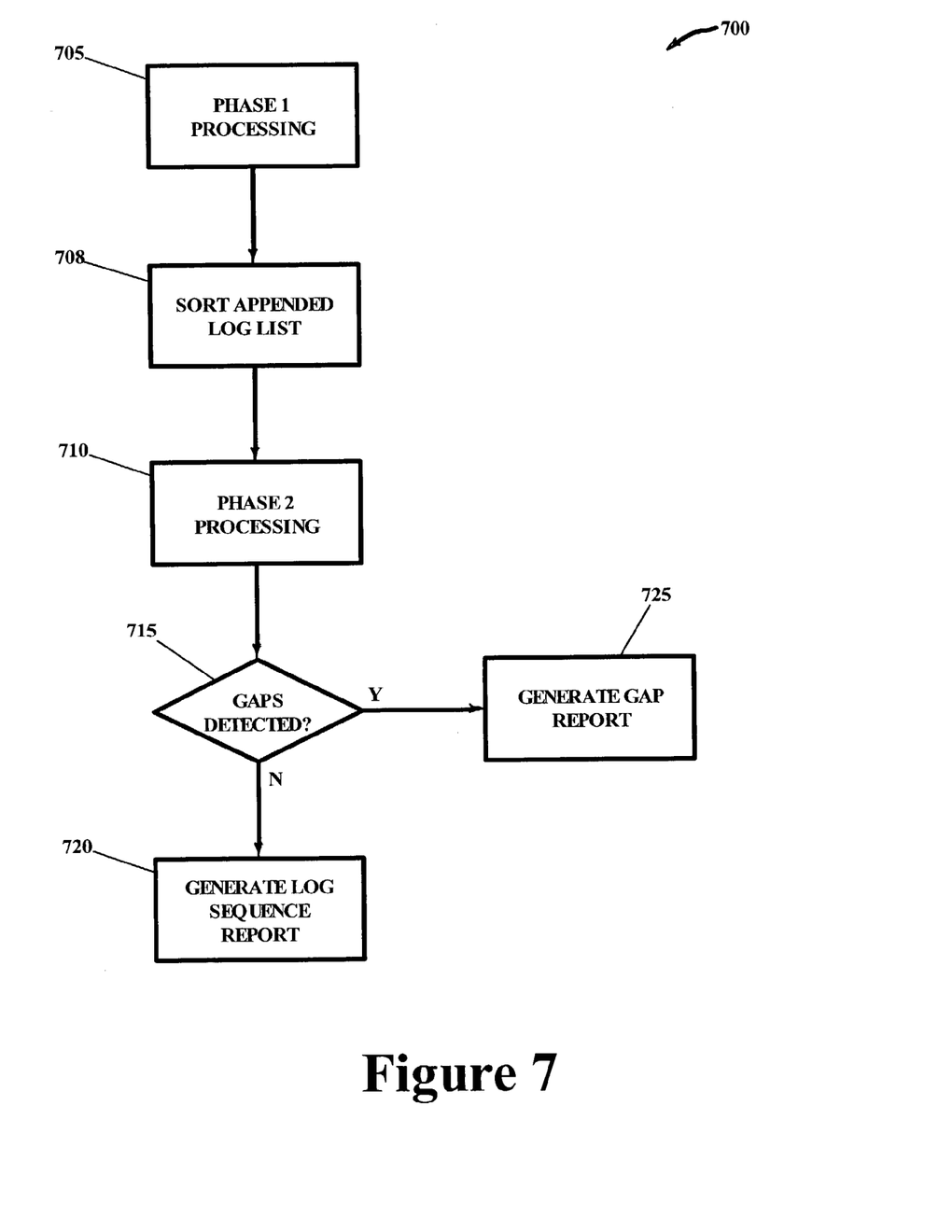
FIG. 7 is a flow diagram summarizing the high level logic of an exemplary log grooming tool in accordance with the present invention.

Referring now to FIG. 7, flow diagram 700 summarizes one embodiment of a high level log grooming process in accordance with the present invention. In step 705, Phase 1 processing is performed. Phase 1 processing is explained in greater detail infra in conjunction with FIG. 8. In step 708, the appended log list generated during Phase 1 processing is sorted in time sequenced order for each System ID. Block diagram 600 of FIG. 6 illustrates an exemplary sort result, as described supra.

Next, in step 710, Phase 2 processing is performed. Phase 2 processing performs gap detection processing, as described infra in conjunction with flow diagram 900 of FIG. 9. In step 715, a test is made to determine if gaps were detected during Phase 2 processing. If so, in step 725, a report is generated identifying range information comprising the logical sequence numbers and time stamp range of one or more missing logs. This Gap Report also includes the sorted appended log list, representing a proper categorization and sequencing for those logs that were identified to the grooming process. An exemplary Gap Report is shown in FIG. 10, as discussed in further detail infra.

Returning now to step 715, if no gaps were detected within the identified set of logs, then a Log Sequence Report is generated representing a comprehensive categorization and sequencing for all logs identified to the grooming process, as represented in the sorted appended log list. A Log Sequence Report is similar to the Gap Report shown in FIG. 10 excepting that, in the absence of gaps, there is no additional gap range information required to be shown.

Referring to FIG. 8, flow diagram 800 summarizes one embodiment for performing Phase 1 processing. The logic steps shown in flow diagram 800 illustrate the processing that is performed for each log of the set of logs identified to the log grooming process. Phase 1 processing is briefly mentioned supra in conjunction with block diagram 500 of FIG. 5.

In step 805, an area of computer memory is cleared for use as a save area by Phase 1 processing. Next, in step 810, a first or next log record is retrieved as the log records are sequentially retrieved from the current log being processed. In step 815, a test is made to determine if the log record exists. If not, in step 820, the appended log list reflecting information extracted to the present is saved. Step 820 is only performed if no System ID was available and, accordingly, in step 825 an indication is set to reflect that further manual processing will be required to complete the grooming process. Processing then terminates at step 840.

Those of ordinary skill in the art will recognize that a System ID is generally available for each log. However, in those cases where a System ID cannot be obtained, the entire automatic grooming process described herein cannot be completed normally and, accordingly, in these circumstances the user may manually review available information to ensure a properly groomed set of logs for a specified time period.

Returning now to step 815, if the first or next record does exist, an additional test is made in step 830 to determine if this is in fact the first log record for the current log. If so, in step 835, the Stored Clock Value and Logical Sequence Number associated with the first log record of the current log are extracted and appended to the entry of the log list associated with the currently processing log. Control then passes to step 845.

Returning now to step 830, if this is not the first record, control passes directly to step 845 where a test is made to determine if a System ID is available from the currently read log record. If not, control returns to step 810, discussed supra. Otherwise processing continues with step 850 where the System ID is extracted. Continuing with step 855, the System ID is appended to the entry of the log list associated with the currently processed log, along with the previously appended Logical Sequence Number and Stored Clock Value. Processing then terminates at step 860. The processing of flow diagram 800 is repeated for each and every log identified in the log list of logs to be groomed.

Those of ordinary skill in the art will recognize that, for IMS systems, the System ID is available from a variety of records. For example, if an IMS log record contains a Unit of Work (UOW) field and within this field the IMS 1 field is equal to the IMS 2 field, then the IMSID may be extracted from the UOW. Other IMS log records also contain an IMSID, such as log record type "06", "55", "56", or "4001". Those of ordinary skill in the art may easily determine the complete set of log record types and subtypes wherein the IMSID may be extracted.

Figure 9:
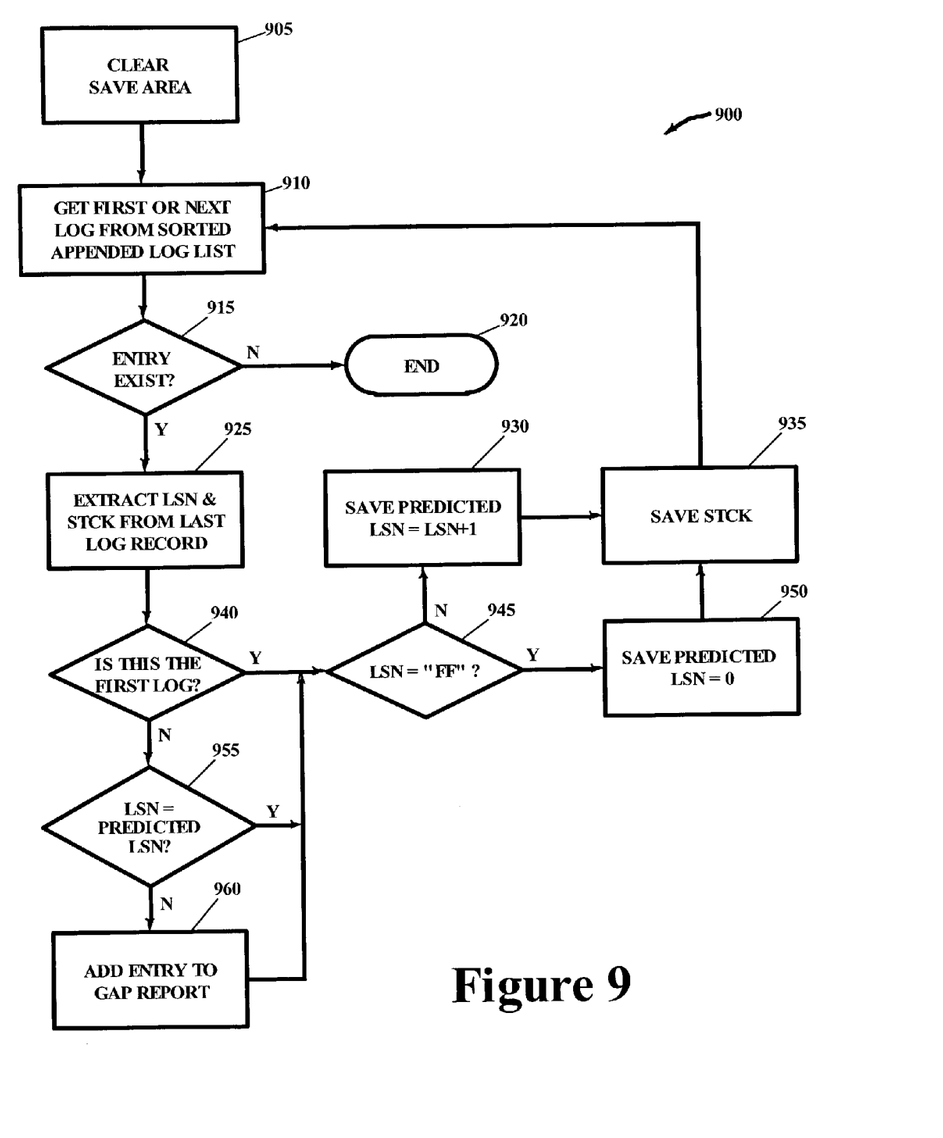
FIG. 9 is a flow diagram summarizing one embodiment of a routine for performing Phase 2 processing.
Figure 10:
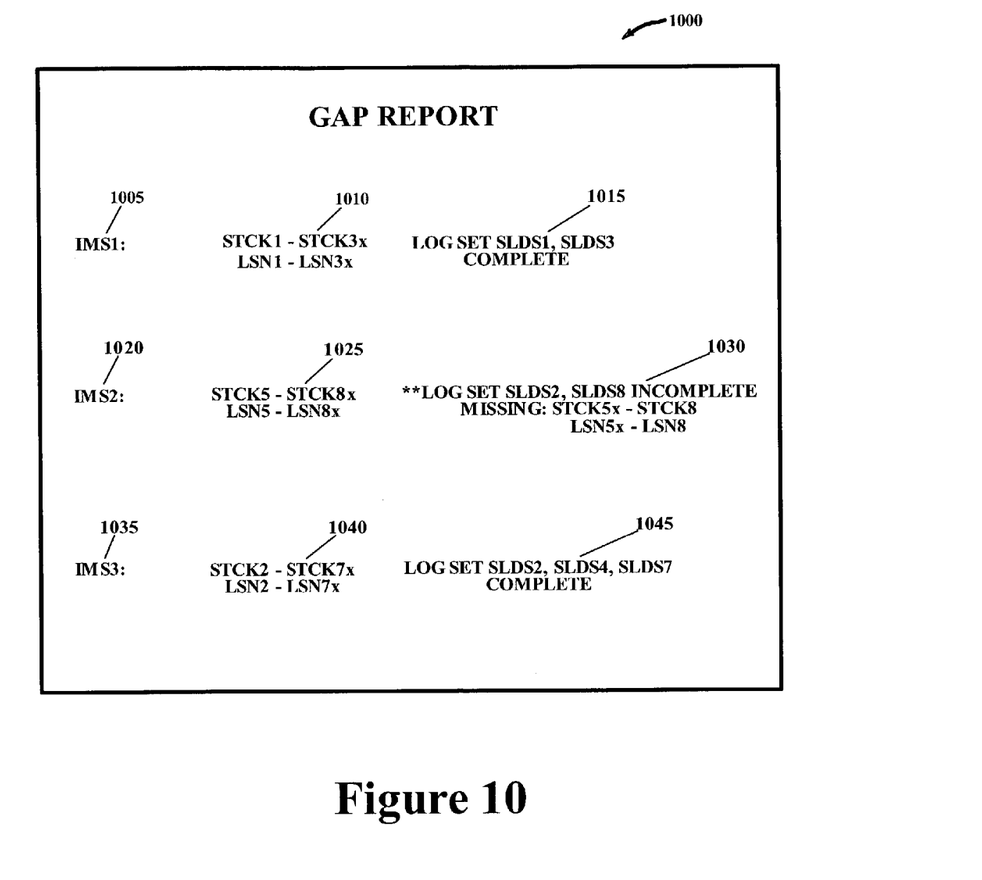
FIG. 10 shows an exemplary Gap Report.

Referring to FIG. 9, flow diagram 900 summarizes one embodiment for performing Phase 2 processing. The logic steps shown in flow diagram 900 illustrate the processing that is performed on the sorted appended log list as a precursor to generating a Gap Report or a Log Sequence Report, as noted in step 725 and step 720 of flow diagram 700, FIG. 7.

In step 905, a save area in which working data can be saved is initialized for use in Phase 2 processing. Next, in step 910, the first or next log is identified from the sorted appended log list. Control then passes to step 915 where a test is made to determine if the next log exists. If not, in step 920, processing is terminated.

Otherwise, processing continues with step 925, where the LSN and STCK are retrieved from the last log record of the current log being processed. Those of ordinary skill in the art will recognize that a variety of techniques may be used to access the last log record. In one embodiment, a "read backward" facility is deployed wherein the last record is directly read from the log following an "open" operation for the log. In an alternative embodiment, log records are sequentially read in a forward direction until the last record, the record preceding end-of-file (EOF), is reached. These and other techniques for accessing particular records of a file are known in the art.

Continuing now with step 940, a test is made to determine if this is the first log from the sorted appended log list. If so, a test is made in step 945 to determine if the LSN for the current log record is equal to four bytes of 'FF'x ('FF'x is the hexadecimal representation for a byte of data comprising eight binary ones). If so, the next sequential LSN value should "wrap" back to zero and, accordingly, in step 950 a zero value is saved as the "Predicted LSN" value; otherwise, in step 930, the Predicted LSN value is set to the sum of the current LSN value plus one. Both step 950 and step 930 subsequently pass control to step 935, where the current Stored Clock Value for the last log record of the currently processed log is saved. Processing then continues with step 910, as discussed supra. Those of ordinary skill in the art will appreciate that step 950 may set the LSN equal to one in a processing environment where the LSN is unity based.

Returning now to step 940, if this is not the first log from the sorted appended log list, then in step 955 a test is made to determine if the previously saved predicted LSN from step 930 or step 950 is equal to the LSN of the first log record of the currently processed log, which was previously extracted and saved in the appended log list during Phase 1 processing. If so, there are no intervening gaps detected between the current log and the previously processed log. Accordingly, processing proceeds to step 945, discussed supra. If the test of step 955 is not equal, then processing proceeds to step 960 where a gap entry is created for use in the Gap Report of step 725 of flow diagram 700, FIG. 7. Processing then continues with step 945, as discussed supra.

A gap entry records the low and high LSNs immediately encompassing the log records of the missing log. In similar fashion, the Stored Clock Values immediately encompassing the log records of the missing log are also recorded. In this way, the receiver of the gap report can immediately identify both the missing Logical Sequence Numbers and Stored Clock Values associated with the one or more missing log files.

Referring now to FIG. 10, an exemplary gap report 1000 is illustrated. Exemplary gap report 1000 illustrates the type of information presented to the user utilizing the exemplary logs 420–455 of FIG. 4 and log list 505 of FIG. 5. The reader will recognize that log list 505, for exemplary purposes, has excluded defined log SLDS6 from the log list of logs to be groomed.

Gap report 1000 comprises an entry for IMS1 1005, IMS2 1020 and IMS3 1035. The entry for IMS1 1005 comprises range information 1010, which delineates the range of stored clock values and the range of logical sequence numbers encompassing the logs associated with IMS1. STCK1 represents the stored clock value for the first log record of SLDS1 and STCK3$x$ represents the stored clock value for the last log record of SLDS3. In like manner LSN1 represents the logical sequence number of the first log record of SLDS1 and LSN3$x$ represents the logical sequence number of the last log record of SLDS3.

The entry for IMS1 1005 further comprises summary information 1015, which identifies the logs, SLDS1 and SLDS3, associated with IMS1. Summary information 1015 also indicates that SLDS1 and SLDS3 represent a complete set of logs for IMS1.

Referring to the entry for IMS2 1020 similar information is recorded for range information 1025; however, summary information 1030 identifies that a gap was detected during the log grooming process by identifying that log SLDS2 and SLDS8 represent an incomplete set of logs for IMS2.

Further, summary information 1030 also includes additional range information identifying the beginning and ending time range immediately encompassing the one or more missing logs, as well as the beginning and ending logical sequence numbers immediately encompassing the one or more missing logs. In this example STCK5$x$, the stored clock value for the last log record of SLDS5, represents the beginning time of missing log records and STCK8, the first log record of SLDS8, represents the ending time of missing log records. In like manner LSN5$x$ through LSN8 represents the missing logical sequence numbers associated with the missing log records for the one or more missing logs.

In like manner, gap report 1000 provides range information 1040 and summary information 1045 for entry IMS3 1035. Similar to the entry for IMS1 1005, the time range and logical sequence number range is provided for the complete set of logs SLDS2, SLDS4 and SLDS7.

Take in combination, flow diagrams 700, 800 and 900 in conjunction with supporting diagrams and detailed descriptions, provide for improved productivity and enhanced reliability by automatically grooming a set of logs for subsequent processing and analysis. Utilizing the teachings contained herein desirable log grooming results are achieved with less manual effort while substantially reducing the possibility of an accidental omission of a critical log, or and inadvertent submission of improperly sequenced logs.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed is:

1. A computer-implemented method for grooming a plurality of logs on a computer system comprising:
   receiving a log list comprising log identifiers wherein said log list delineates a set of logs to be groomed;

extracting a log sequence number and a time-stamp from the first log record of each log in said set of logs;

extracting a system ID from a log record for each log in said set of logs;

creating an appended log list wherein said system ID, said time-stamp and said log sequence number comprise appended information that is logically appended to each of respective ones of said log identifiers;

sorting said appended log list utilizing at least a portion of said appended information, the results of said sorting comprising a sorted appended log list;

extracting an actual log sequence number from the last log record of each log in said set of logs;

comparing each of said actual log sequence numbers to a corresponding predicted log sequence number wherein said corresponding predicted log sequence number is computed utilizing said sorted appended log list; and generating a report wherein range information reflecting all discrepancies between said actual log sequence numbers and said corresponding predicted log sequence numbers are disclosed.

2. The method of claim 1 wherein said report comprises a Gap Report, and wherein said Gap Report discloses a system ID and a time-stamp range associated with at least one missing log.

3. The method of claim 1 further comprising generating a Log Sequence Report wherein said Log Sequence Report discloses a time sequence ordering of said set of logs for each of said System IDs.

4. The method of claim 1 wherein said system ID is an IMSID (Information Management System Identifier).

5. The method of claim 4 wherein said set of logs comprises IMS SLDS (Information Management System System Log Data Sets) logs.

6. The method of claim 5 wherein said IMSID is obtained from a Begin Checkpointing log record.

7. The method of claim 1 wherein said sorting comprises ordering said appended log list by said system IDs, and, for each of said system IDs, further ordering said appended log list by said time-stamps.

8. A computer-implemented method for grooming a set of logs, comprising:

identifying a log grooming tool on a Job Control Language EXEC statement;

creating an appended log list wherein said appended log list identifies each log of said set of logs to be groomed, the appended log list comprising at least a time-stamp and a log sequence number logically appended to each respective log identifier of a log list, the time-stamp and log sequence number being extracted from the first log record of each log in said log list;

making said appended log list available to said log grooming tool, said log grooming tool configured to compare a predicted log sequence number to an actual log sequence number extracted from a last log record in each log in said log list, the predicted log sequence number computed utilizing said appended log list;

submitting a job for execution on a computer system wherein said job comprises said Job Control Language Exec statement;

receiving a report generated by said log grooming tool; and utilizing said report to prepare for subsequent processing on said set of logs.

9. A computer system for grooming a plurality of logs comprising:

a computer;

a Phase 1 processing component, wherein said Phase 1 processing component performs log processing comprising receiving a log list comprising log identifiers wherein said log list delineates a set of logs to be groomed, extracting a log sequence number and a time-stamp from the first log record of each log in said set of logs, extracting a system ID from a log record for each log in said set of logs, and creating an appended log list wherein said system ID, said time-stamp and said log sequence number comprise appended information that is logically appended to each of respective ones of said log identifiers;

a sort component for sorting said appended log list utilizing at least a portion of said appended information thereby generating a sorted appended log list;

a Phase 2 processing component wherein said Phase 2 processing component performs additional log processing comprising extracting an actual log sequence number from the last log record of each log in said set of logs, and comparing each of said actual log sequence numbers to a corresponding predicted log sequence number wherein said corresponding predicted log sequence number is computed utilizing said sorted appended log list; and a report generation component for generating a report wherein range information reflecting all discrepancies between said actual log sequence numbers and said corresponding predicted log sequence numbers are disclosed in said report.

10. The computer system of claim 9 wherein said report comprises a Gap Report, and wherein said Gap Report discloses a system ID and a time-stamp range associated with at least one missing log.

11. The computer system of claim 9 further comprising generating a Log Sequence Report wherein said Log Sequence Report discloses a time sequence ordering of said set of logs for each of said System IDs.

12. The computer system of claim 9 wherein said system ID is an IMSID (Information Management System Identifier).

13. The computer system of claim 12 wherein said set of logs comprise IMS SLDS (Information Management System System Log Data Sets) logs.

14. The computer system of claim 13 wherein said IMSID is obtained from a Begin Checkpointing log record.

15. The computer system of claim 9 wherein said sorting comprises ordering said appended log list by said system IDs, and, for each of said system IDs, further ordering said appended log list by said time-stamps.

16. An article of manufacture for use in a computer system tangibly embodying computer instructions executable by said computer system to perform a method for grooming a plurality of logs, said method comprising:

receiving a log list comprising log identifiers wherein said log list delineates a set of logs to be groomed;

extracting a log sequence number and a time-stamp from the first log record of each log in said set of logs;

extracting a system ID from a log record for each log in said set of logs;

creating an appended log list wherein said system ID, said time-stamp and said log sequence number comprise appended information that is logically appended to each of respective ones of said log identifiers;

sorting said appended log list utilizing at least a portion of said appended information, the results of said sorting comprising a sorted appended log list;

extracting an actual log sequence number from the last log record of each log in said set of logs;

comparing each of said actual log sequence numbers to a corresponding predicted log sequence number wherein said corresponding predicted log sequence number is computed utilizing said sorted appended log list; and generating a report wherein range information reflecting all discrepancies between said actual log sequence numbers and said corresponding predicted log sequence numbers are disclosed.

17. The article of manufacture of claim 16 wherein said report comprises a Gap Report, and wherein said Gap Report discloses a system ID and a time-stamp range associated with at least one missing log.

18. The article of manufacture of claim 16 wherein said method further comprises generating a Log Sequence Report, and wherein said Log Sequence Report discloses a time sequence ordering of said set of logs for each of said System IDs.

19. The article of manufacture of claim 16 wherein said system ID is an IMSID) (Information Management System Identifier).

20. The article of manufacture of claim 19 wherein said set of logs comprises IMS SLDS (Information Management System System Log Data Sets) logs.

21. The article of manufacture of claim 20 wherein said IMSID is obtained from a Begin Checkpointing log record.

22. The article of manufacture of claim 16 wherein said sorting comprises ordering said appended log list by said system IDs, and, for each of said system IDs, further ordering said appended log list by said time-stamps.

* * * * *